(12) United States Patent
Elsayed et al.

(10) Patent No.: US 12,180,083 B1
(45) Date of Patent: Dec. 31, 2024

(54) METHOD FOR PRODUCING SODA ASH

(71) Applicant: United Arab Emirates University, Al Ain (AE)

(72) Inventors: Ahmed Nasereldin Elsayed, Al Ain (AE); Ali Al Marzouqi, Al Ain (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 18/392,697

(22) Filed: Dec. 21, 2023

(51) Int. Cl.
    *C01D 7/12* (2006.01)
(52) U.S. Cl.
    CPC .................................... *C01D 7/12* (2013.01)
(58) Field of Classification Search
    CPC .......................................................... C01D 7/12
    See application file for complete search history.

(56) References Cited

U.S. PATENT DOCUMENTS 2,737,440 A * 3/1956 Roberts .................... C01D 7/18
                                                        23/302 R
4,320,106 A * 3/1982 Hentschel ................ C01D 7/16
                                                        423/481

OTHER PUBLICATIONS

Ahmed Elsayed, "Path toward sustainable desalination: Sodium precipitation and carbon capture", 2023, 1-11, vol. 549, Desalination.

* cited by examiner

*Primary Examiner* — Stuart L Hendrickson
(74) *Attorney, Agent, or Firm* — Hayes Soloway PC (57) ABSTRACT

The present disclosure discloses a method for producing soda ash (sodium carbonate). The method comprises feeding a pressurized saline solution into a high-pressure absorption column; feeding pressurized carbon dioxide into the high-pressure absorption column; dissolving the carbon-dioxide into the saline solution within the high-pressure absorption column; discharging a high-pressure absorption column outlet stream to a filter; filtering sodium hydrogen carbonate from the high-pressure absorption column outlet stream; and feeding the sodium hydrogen carbonate to a calciner to convert the sodium hydrogen carbonate to soda ash. The pressure of the high-pressure absorption column is between 54 to 80 bar.

15 Claims, 4 Drawing Sheets

METHOD FOR PRODUCING SODA ASH

TECHNICAL FIELD

The present disclosure relates to a method for producing soda ash. More specifically but not exclusively, the present disclosure relates to a method for producing soda ash by using a high-pressure absorption column.

BACKGROUND

Background description includes information that will be useful in understanding the present invention. It is not an admission that any of the information provided herein is prior art or relevant to the presently claimed invention, or that any publication specifically or implicitly referenced is prior art.

The Solvay process is an industrial method used to produce soda ash (sodium carbonate—$Na_2CO_3$) from table salt (sodium chloride—NaCl) and limestone (calcium carbonate—$CaCO_3$). It was developed by Ernest Solvay in the 19th century and revolutionized the production of soda ash, which is a key ingredient in various industries such as glass, paper, and chemicals. It typically involves several steps: Ammonia is absorbed into a brine solution to form ammonium chloride and sodium chloride. Carbon dioxide is introduced into the ammoniated brine, leading to the formation of sodium hydrogen carbonate as a precipitate. The precipitate is separated and then heated to release carbon dioxide and water vapor, converting it into sodium carbonate. Ammonia is recovered and recycled using the limestone feedstock. The resulting soda ash is collected, offering a cyclic process for large-scale synthetic soda ash production. The Solvay process remains a significant industrial chemical today.

The Solvay process commences with recycled ammonia gas bubbled and dissolved into the brine solution (sodium chloride). Afterwards, carbon dioxide is bubbled into the ammoniated brine to eventually form bicarbonate ions. These bicarbonate ions then react with sodium ions present in the solution to form sodium bicarbonate as a solid precipitate. Sodium bicarbonate is filtered out and calcinated at high temperature. It decomposes it into sodium carbonate, water, and carbon dioxide. The remaining solution, which contains ammonium chloride, is then mixed with calcium oxide, and heated. The reaction produces calcium chloride and regenerates ammonia gas. Calcium oxide and carbon dioxide are both obtained from calcinating and decomposing calcium carbonate.

The Solvay process generates several waste products and byproducts at different stages of its operation. The purification of the salt feedstock results in waste consisting of the extracted impurities. Another source of waste comes from the calcination of limestone, used as a feedstock. This calcination generates kiln waste, including partially reacted limestone and other tailings. The process also results in tailings from sodium carbonate production, which include unreacted chemicals and other byproducts. Among the main byproducts of the Solvay process is calcium chloride. While calcium chloride has some commercial use, there are instances where it cannot be economically utilized or sold, leading to its discharge as waste.

Hou's process is a modified version of the Solvay process that upcycles the calcium chloride byproduct. A key feature is the integration of ammonia production with soda ash production, eliminating the need for limestone as a primary feedstock. In this integrated system, the ammonia plant serves a dual purpose, supplying both ammonia and carbon dioxide. The procedure begins with the ammoniation of brine, followed by its carbonation. During the carbonation, sodium bicarbonate precipitates from the solution and is subsequently filtered out. This leaves ammonium chloride in the aqueous solution. Sodium chloride is dissolved into the solution and then cooled to salt out ammonium chloride. This precipitated ammonium chloride is used as a fertilizer, while the remaining salt solution, is recycled back into the process.

A significant limitation with the Solvay/Hou process is its dependency on high concentrations of sodium chloride for optimal performance. The Solvay process requires the aqueous solution to be saturated or nearly saturated with sodium chloride, with concentration levels reaching upwards of 26 wt. %, 36 g/L, or 6M (moles per liter). Sodium chloride is typically sourced from salt mines or by evaporating seawater. Preparing this sodium chloride feedstock entails a separate, dedicated set of units designed for the extraction and processing of the salt to achieve the required concentration.

Furthermore, there are additional problems with handling and processing saturated brines. Dissolved sodium chloride requires heating and cooling energy to reach super saturated levels. Brine solutions need to be pretreated to remove scaling ions. Special types of equipment are required to transport brines between various units. These units would require to be coated with a special type of material to handle scaling and corrosion.

Existing processes depend on high salinity brines, are energy intensive, not sustainable, and do not contribute to the circular economy.

The present disclosure seeks to mitigate one or more of the abovementioned problems. More specifically but not exclusively, the present disclosure seeks to provide an improved method for producing soda ash.

SUMMARY

According to a first aspect of the present disclosure, there is provided a method for producing soda ash (sodium carbonate). The method comprises: feeding a pressurized saline solution into a high-pressure absorption column; feeding pressurized carbon dioxide into the high-pressure absorption column; dissolving the carbon-dioxide into the saline solution within the high-pressure absorption column; discharging a high-pressure absorption column outlet stream to a filter; filtering sodium hydrogen carbonate from the high-pressure absorption column outlet stream; and feeding the sodium hydrogen carbonate to a calciner to convert the sodium hydrogen carbonate to soda ash. The pressure of the high-pressure absorption column is between 54 to 80 bar.

The use of high pressure in the high-pressure absorption column surprisingly enhances both sodium bicarbonate (sodium hydrogen carbonate—$NaHCO_3$) formation as part of the soda ash production process and enhances the absorption of carbon dioxide into the saline solution. The use of a filter to filter out the precipitated sodium bicarbonate results in an efficient process for the generation of sodium bicarbonate.

The saline solution may be saturated with carbon dioxide within the high-pressure absorption column.

The saturation with carbon dioxide removes the small amount of sodium ions that are dissolved. This is advantageous, in contrast with the Solvay process, for example, as the Solvay process requires saturation of sodium ions and precipitation with any carbon dioxide that is able to be dissolved. The saturation of carbon dioxide enables the use of relatively low salinity brines for effective soda ash production.

Advantageously, the calciner facilitates the final step that results in the formation of soda ash.

The calciner may be a soda ash calciner.

The calciner may produce carbon dioxide.

The carbon dioxide produced by the calciner may be recycled into the high-pressure absorption column.

The pressurized saline solution may have a sodium chloride concentration of less than 3 M (moles per liter). The pressurized saline solution may have a sodium chloride concentration of less than 2.5 M. The pressurized saline solution may have a sodium chloride concentration of less than 2 M. The pressurized saline solution may have a sodium chloride concentration of less than 1.5 M. The pressurized saline solution may have a sodium chloride concentration of less than 1 M.

The method of the present disclosure is advantageously able to produce soda ash using relatively low salinity brines.

The pressure of the high-pressure absorption column may be between 54 to 73.64 bar.

Carbon dioxide may transition to a supercritical fluid at pressures above 73.64 bar and 31 degrees Celsius, and as such it may be optimal to ensure that the pressure and temperature of the high-pressure absorption column has a pressure and temperature that is less that the supercritical conditions of carbon dioxide.

The pressurized saline solution may comprise a solvent.

The solvent may assist in the absorption/dissolution of carbon dioxide into the saline solution.

Throughout this disclosure, where the term saline solution is used, it does not exclude the potential inclusion of other additives or solvents. The term saline solution is to be interpreted as water comprising dissolved sodium chloride.

The solvent may be an absorbent. The solvent may be ammonia.

It has been surprisingly found that the use of ammonia in combination with a high-pressure absorption column has the synergistic effect of optimizing the amount of carbon dioxide that can be absorbed by the saline solution.

The method may absorb greater than 300 kg of carbon dioxide per cubic meter of saline solution. The method may absorb between 300 and 450 kg of carbon dioxide per cubic meter of saline solution. The method may absorb between 350 and 450 kg of carbon dioxide per cubic meter of saline solution This is a significant improvement over the absorption capacity over existing systems that target low salinity brines.

In embodiments, the term saline solution and brine may be used interchangeably.

The method may remove between 70% to 80% of the sodium from the saline solution. The method may reduce the sodium concentration from the saline solution to below 0.3 M. The method may reduce the sodium concentration from the saline solution to below 0.2 M.

The pressurized saline solution may comprise ammonia.

The method may comprise the step of feeding a saline feed into a low-pressure column.

The method may comprise the step of feeding ammonia into the low-pressure column.

The method may comprise the step of mixing the saline feed with ammonia prior to being fed into the low-pressure column.

The method may comprise forming an ammonia-saline solution within the low-pressure column.

The method may comprise discharging a low-pressure column outlet stream to a pump. A pump outlet stream may be the pressurized saline solution. The pressure of the low-pressure column may be less than the pressure of the high-pressure absorption column.

The saline feed may have a sodium chloride concentration of less than 3 M. The saline feed may have a sodium chloride concentration of less than 2.5 M. The saline feed may have a sodium chloride concentration of less than 2 M. The saline feed may have a sodium chloride concentration of less than 1.5 M. The saline feed may have a sodium chloride concentration of less than 1 M. The saline feed may have a sodium chloride concentration of less than 0.5 M.

The low-pressure column may be a low-pressure absorption column.

The low-pressure column may comprise ammonium chloride.

The pressure of the pump outlet stream is greater than or equal to the pressure of the high-pressure absorption column.

The pressure of the pump outlet stream being greater than or equal to the pressure of the high-pressure absorption column ensures that the fluid flow within the system flows in the correct direction, from the low-pressure column to the high-pressure absorption column.

As, in embodiments, the ammonia is recycled during the process, the step of feeding ammonia into the low-pressure column may occur in a set-up phase of the method.

The method may comprise the steps of heating calcium carbonate to form carbon dioxide; and pressurizing the carbon dioxide to form the compressed carbon dioxide.

Calcium carbonate may also be known as limestone. Heating the calcium carbonate ($CaCO_3$) may produce calcium oxide and carbon dioxide.

The calcium oxide produced by the heating of the calcium carbonate may be used elsewhere in the method. For example, the calcium oxide may be fed into the recovery column to recycle the ammonia.

The pressure of the compressed carbon dioxide may be greater than or equal to the pressure of the high-pressure absorption column.

The pressuring of the carbon dioxide may take place in a compressor.

In embodiments, pressure exchange systems may be used to recover pressure downstream to pressurize streams entering the high-pressure absorption column.

The saline solution feed may originate from a desalination system. The saline solution feed may originate from a reverse osmosis desalination system. The saline solution feed may originate from brine waste streams.

This process may serve as a specialized brine mining technique that specifically targets the selective extraction of sodium ions from brine waste streams.

Typically, outlet brine streams from reverse osmosis desalination systems are at very high pressure as high pressure is needed to overcome the osmotic pressure at the membrane interface and force pure water through the membrane. Using a stream of brine or saline solution from reverse osmosis utilizes the high pressure, increasing the energy efficiency of the combined process.

In embodiments, where there is a low-pressure column, pressure recovery may be employed such that the energy recovered from reducing the pressure of the brine stream from the reverse osmosis desalination system is used to increase the pressure of the low-pressure column outlet stream. Further pressure recovery may be employed downstream of the high-pressure column, to either pressurise the inlet streams to the high-pressure column, or to pressurise the saline solution entering the reverse osmosis system.

A filtrate from the filter may feed into a recovery column.

The filtrate may comprise ammonium chloride solution. The filtrate may comprise unreacted sodium chloride. The filtrate may comprise unreacted carbon dioxide. The filtrate may comprise unreacted ammonium chloride.

The recovery column may recycle carbon dioxide to the high-pressure column.

A filtrate from the filter may feed into a recovery column, and the recovery column may recycle carbon dioxide and ammonia to the high-pressure column.

A filtrate from the filter may feed into a recovery column, and the recovery column may recycle carbon dioxide and ammonia to the low-pressure column.

Ammonium chloride may be output from the recovery column.

The production of ammonium chloride has an advantage in that it can increase the ecological efficiency of the process. The ammonium chloride may take its part in the circular economy and be used in other industries, such as in farming as a fertilizer, for example.

Undissolved recycled ammonia and carbon dioxide from the low-pressure column may be fed into the high-pressure column.

The recycled ammonia and unreacted carbon dioxide that reached the recovery column can be recycled back into the first, low-pressure column, where it is dissolved into the saline solution. Any undissolved ammonia and carbon dioxide may be fed through to the second, high-pressure absorption column where the ammonia and carbon dioxide may be fully dissolved into the saline solution.

The method may comprise the steps of heating calcium carbonate to form carbon dioxide; and pressurizing the carbon dioxide to form the compressed carbon dioxide.

A filtrate from the filter may feed into a recovery column, and the recovery column may recycle carbon dioxide and ammonia to the low-pressure column.

Undissolved recycled ammonia and carbon dioxide from the low-pressure column may be fed into the high-pressure column.

The step of heating may form carbon dioxide and calcium oxide. The method may comprise feeding the calcium oxide into the recovery column.

By feeding calcium oxide into the recovery column, the calcium may replace the ammonium ion to form calcium chloride, water, and ammonia.

The recovery column may be a distillation column.

An outlet stream of the recovery column may comprise calcium chloride solution.

According to a second aspect of the present disclosure there is provided a soda ash production system. The soda ash production system comprises a high-pressure absorption column having a pressure of between 54 to 80 bar. The soda ash production system comprises a filter fluidly connected to an outlet of the high-pressure column and a calciner connected to the filter. The high-pressure absorption column is configured to receive pressurized saline solution and pressurized carbon dioxide. The filter is configured to filter sodium hydrogen carbonate from the high-pressure absorption column outlet. The calciner is configured to convert the sodium hydrogen carbonate to soda ash.

The calciner may function by heating the sodium hydrogen carbonate in the absence of oxygen.

The soda ash production system may comprise a low-pressure column upstream of, and fluidly connected to, the high-pressure column. The low-pressure column may be configured to combine ammonia and a saline feed to form an ammonia-saline solution. The soda ash production system may comprise a pump configured to pressurize the ammonia-saline solution prior to being fed into the high-pressure column.

Being fluidly connected to may mean that fluid is able to flow from one piece of apparatus to the other. Being fluidly connected does not exclude the presence of intervening process apparatus such as pumps, compressors, valves, or pressure recovery devices, etc. Being fluidly connected may exclude the presence of intervening apparatus that chemically changes the fluid passing through (such as a reaction vessel) or physically changes the fluid passing through such that the inlet stream contents are different to the outlet stream contents (such as an absorption column, or distillation column, for example).

The soda ash production system may comprise a heating system for heating calcium carbonate. The heating system may be fluidly connected to a compressor such that carbon dioxide formed by heating the calcium carbonate may be fed to the compressor and an outlet stream of the compressor is the pressurized carbon dioxide.

The soda ash production system may comprise a recovery column. The recovery column may be configured to receive calcium oxide from the heating system, and filtrate from the filter. The recovery column may also be configured to recycle carbon dioxide and ammonia to the low-pressure column.

BRIEF DESCRIPTION OF THE DRAWINGS

The manner in which the above-recited features of the present invention is understood in detail, a more particular description of the invention, briefly summarized above, may be had by reference to embodiments, some of which are illustrated in the appended drawings. It is to be noted, however, that the appended drawings illustrate only typical embodiments of the present disclosure and are therefore not to be considered limiting of its scope, for the present disclosure may admit to other equally effective embodiments.

The foregoing and other objects, features and advantages of the present invention, as well as the invention itself, will be more fully understood from the following description of preferred embodiments, when read together with the accompanying drawings.

DETAILED DESCRIPTION

The present disclosure relates to the field of soda ash production.

The principles of the present invention and their advantages are best understood by referring to FIGS. 1 to 8. In the following detailed description of illustrative or exemplary embodiments of the disclosure, specific embodiments in which the disclosure may be practiced are described in sufficient detail to enable those skilled in the art to practice the disclosed embodiments. The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

Figure 1:
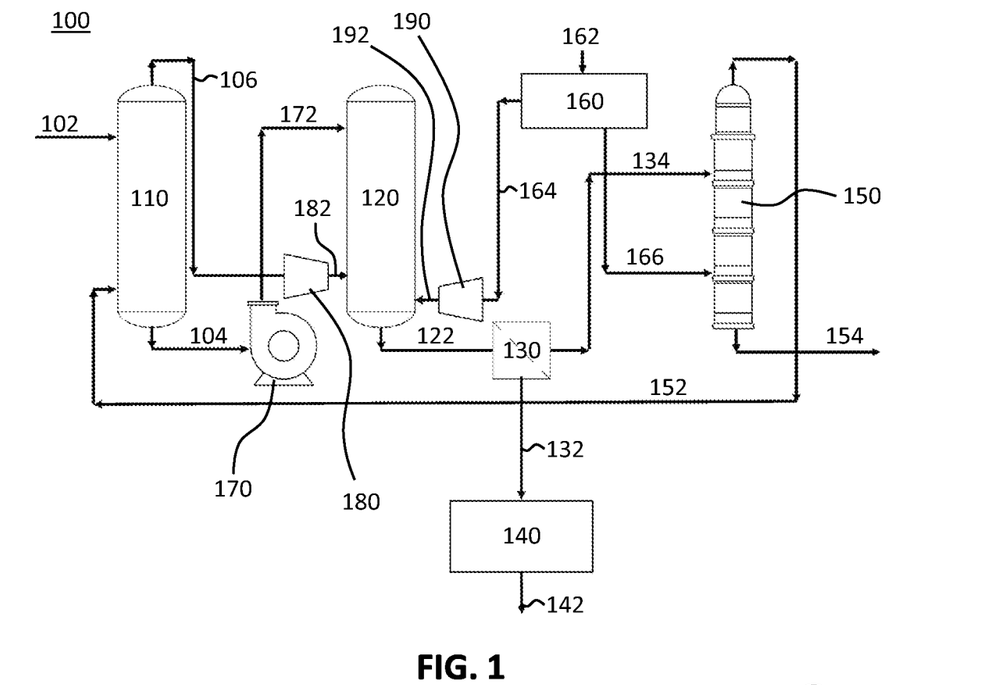
FIG. 1 shows a process flow diagram illustrating a method for producing soda ash using a soda ash production system according to an embodiment of the present disclosure.

FIG. 1 shows a process flow diagram illustrating a method for producing soda ash using a soda ash production system according to an embodiment of the present disclosure.

The soda ash production system 100 comprises a low-pressure column 110. The low-pressure column 110 has a feed stream 102 entering the column. The feed stream 102 comprises saline feed (saline solution, or brine). The concentration of sodium chloride in the saline feed is at least 0.35 M (moles per liter), or 2 wt. %, or 20 g/L. This concentration of sodium chloride is significantly less than the minimum requirement for other conventional processes (26 wt. %, 360 g/L, or 6 M), meaning that a more diverse saline stream can be used by the system and method of the present disclosure. Other viable sources of sodium chloride include but are not limited to saline aquifers, wastewater from oil and gas drilling operations, and wastewater from flue gas desulfurization processes, for example. Each of these sources has unique characteristics and concentrations of sodium chloride, offering a diverse array of options. The feed stream 102 also comprises a stream of ammonia. The feed stream 102 may comprise two distinct streams, one stream of saline solution, and one stream of gaseous ammonia. In embodiments, the ammonia and the saline solution mix within the low-pressure column. In embodiments, the saline solution is fed into the low-pressure column as a liquid, and the ammonia is fed into the low-pressure column as a gas.

The amount of ammonia added in the feed stream 102 during operation of the system is only enough to account for the ammonia that is lost through system (in an ideal process all of the ammonia is recycled and remains within a perfect cyclic process).

The pressure of the low-pressure column may be low enough that ammonia remains in the gas phase while in the low-pressure column.

In embodiments, the low-pressure column 110 is a bubble column reactor, and ammonia is bubbled through the column. In embodiments of the present disclosure, the low-pressure column is a fluidized bed. In embodiments of the present disclosure, the low-pressure column is a packed bed.

As discussed later with respect to the recovery column 150, recycled ammonia and carbon dioxide 152 is also fed into the low-pressure column 110. The recycled ammonia and carbon dioxide may be bubbled into the low-pressure column.

Undissolved recycled carbon dioxide and ammonia exits the low-pressure column 110 through a low-pressure gas outlet stream 106. This low-pressure outlet stream 106 comprising undissolved ammonia and carbon dioxide feeds into a compressor 180. The compressor increases the pressure of the low-pressure outlet stream to at least 54 bar, and to a pressure that is at least equal to the pressure within the high-pressure absorption column 120.

The now high-pressure undissolved ammonia and carbon dioxide 182 is fed into the high-pressure absorption column.

Leaving the low-pressure column in a liquid phase low-pressure column outlet stream 104 is a mixture of saline solution (water comprising dissolved sodium chloride), ammonium ions, hydroxide ions, and aqueous carbon dioxide (dissolved from the recycle stream 152). The basic chemical processes/equilibria in this section of the process are as follows:

$$H_2O_{(l)} <-> H^+ + OH^- \qquad R1:$$

$$NH_{3\,(aq.)} + H^+ <-> NH_4^+ \qquad R2:$$

$$CO_{2\,(aq.)} + OH^- <-> HCO_3^- \qquad R3:$$

$$HCO_3^- <-> H^+ + CO_3^{2-} \qquad R4:$$

$$CO_{2\,(aq.)} + NH_{3\,(aq.)} <-> NH_2COO^- + H^+ \qquad R5:$$

$$NaHCO_{3\,(s)} <-> Na^+ + HCO_3^- \qquad R6:$$

$$NH_4HCO_{3\,(s)} <-> NH_4^+ + HCO_3^- \qquad R7:$$

Relatively little precipitate is formed in the first low-pressure column 110. Leaving the low-pressure column in a liquid phase low-pressure column outlet stream 104 is a mixture of saline solution (water comprising dissolved sodium chloride), ammonium ions, hydroxide ions, and aqueous carbon dioxide (dissolved from the recycle stream 152).

The low-pressure column outlet stream 104 passes into a pump 170. The pump 170 may be any type of suitable pump for pressurizing fluid in the liquid phase. The pump outlet stream 172 comprises a high-pressure solution of saline solution (water comprising dissolved sodium chloride), ammonium ions, hydroxide ions, and aqueous carbon dioxide. The pump outlet stream 172 feeds into the high-pressure absorption column 120. The high-pressure absorption column 120 is operated at a pressure of around 70 bar. In embodiments, the high-pressure absorption column is operated at 68.7 bar. The high-pressure absorption column is operated at a temperature of 22.2 degrees Celsius. In embodiments, the high-pressure absorption column is operated at a temperature of between 15 and 25 degrees Celsius.

The now high-pressure undissolved ammonia and carbon dioxide 182 is fed into the high-pressure absorption column.

Also feeding into the high-pressure absorption column is a pressurized carbon dioxide stream 192.

In the high-pressure absorption column 120, the dissolved carbon dioxide reacts with the hydroxide ions to form hydrogen carbonate ions (R3). These bond with the sodium ions to precipitate out sodium hydrogen carbonate (R6). What remains in solution is:

$$NH_4Cl_{(aq.)} <-> NH_4^+ + Cl^- \qquad R8:$$

In addition to ammonium chloride, there remains some unreacted/carbon dioxide, unreacted ammonia, and sodium chloride.

It has been surprisingly found that increased pressure and increased ammonia concentration increased the amount of carbon dioxide that can be absorbed/dissolved and reacted.

Figure 2:
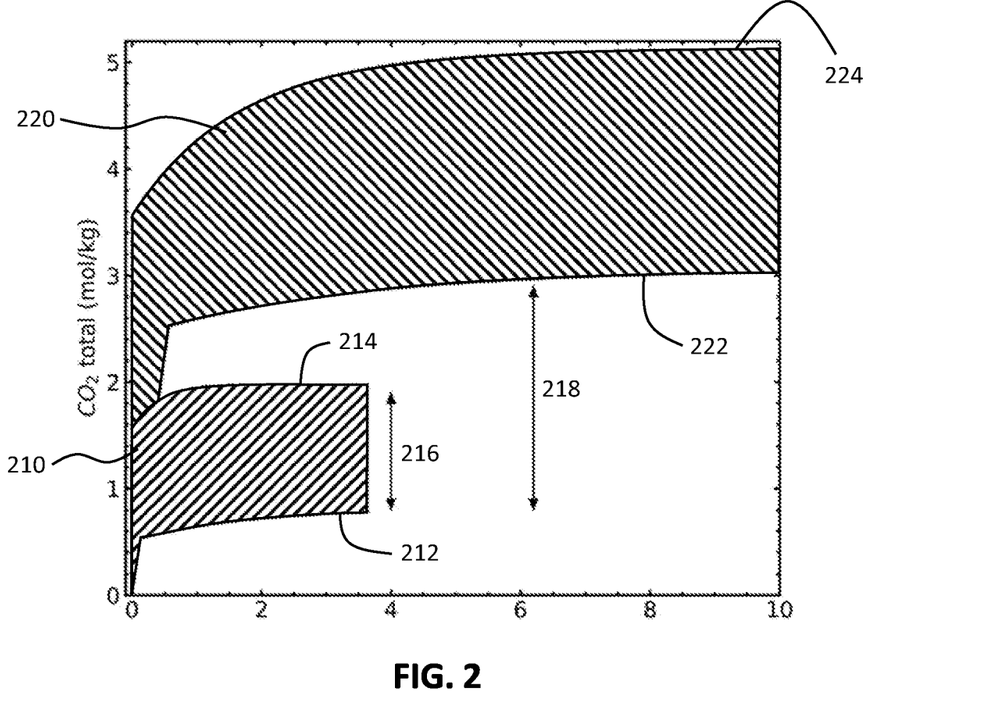
FIG. 2 shows a graph indicating the dissolution of carbon dioxide in ammoniated brine over time, with varying ammonia concentration and varying pressure according to an embodiment of the present disclosure.

FIG. 2 shows a graph indicating the dissolution of carbon dioxide in ammoniated brine over time, with varying ammonia concentration and varying pressure, according to an embodiment of the present disclosure.

The lower section of the graph 210 shows the dissolution curve for carbon dioxide when the concentration of ammonia is 1 M (mol/l). The upper bound 214 is the dissolution curve when the pressure is 70 bar. The lower bound 212 is dissolution curve when the pressure is 1 bar. Arrow 216 indicates the variability in carbon dioxide solubility over time when the pressure is varied.

The upper section of the graph 220 shows the dissolution curve for carbon dioxide when the concentration of ammonia is 5M. It is clear that the increased ammonia concentration has a significant effect on the amount of carbon dioxide that can be dissolved into the brine.

Additionally, the upper bound 224 is the dissolution curve when the pressure is 70 bar. The lower bound 222 is the dissolution curve when the pressure is 1 bar.

The arrow 218 indicates the variability in carbon dioxide solubility over time when ammonia concentration is varied.

It has been surprisingly found that carbon dioxide has an increased absorption rate into brine when the ammonia concentration is increased in conjunction with the pressure. Pressure affects the total amount of carbon dioxide that is dissolved, although this effect decreases with increased ammonia concentration. The concentration of ammonia is important in dissolving large quantities of carbon dioxide, and the pressure is important in ensuring that most of the dissolved carbon dioxide forms bicarbonate ions. Pressure is also the only variable that is capable of changing the pH (decreasing) and reducing the amount of carbamate ions present (carbamate ions are an undesirable product of carbon dioxide and ammonia) (R5).

The composition of the feed brine stream is important for optimal performance. Generally, one liter of feed stream 102 is capable of dissolving over 18 moles of $NH_3$, equivalent to 23 wt. %. Furthermore, the loading capacity of carbon dioxide in ammonia is subject to various influencing factors, such as desired pH, residence time, and other absorption characteristics. From simulation and optimization, it was determined that the optimal loading capacity is 0.87 moles of carbon dioxide absorbed per mole of dissolved ammonia. This ratio ensures effective and efficient absorption while maximizing the sodium removed. Additionally, the total amount of carbon dioxide of 8.7 moles could be dissolved before ammonium bicarbonate, an undesired product, precipitates (R7).

The precipitation of sodium bicarbonate depends on the concentration of sodium chloride and the concentration of carbon dioxide. In this context, ammonia serves a critical role, functioning as a base and absorbent, which significantly enhances the solubility of $CO_2$ in the solution. In current iterations of the Solvay process, for example, carbon dioxide typically acts as the limiting reagent. This limitation is due to the process's design, which saturates the aqueous solution with sodium chloride. The amount of sodium bicarbonate precipitated is thus constrained by the amount of $CO_2$ that can be dissolved under given conditions.

The chemical dynamics are reversed in embodiments of the present disclosure. Sodium chloride becomes the limiting reactant by employing conditions that allow for the dissolution of exceptionally high quantities of $CO_2$ at elevated pressures. This modification in the chemical equilibrium is particularly beneficial when the objective is to minimize the concentration of sodium ions in the solution. This shift is evident in the significantly enhanced absorption capacity of the process according to embodiments of the present disclosure. Embodiments achieve an absorption capacity of 385 g of $CO_2$ per liter of brine feed, compared with 50 g/L with current iterations of the Solvay process.

Figure 8:
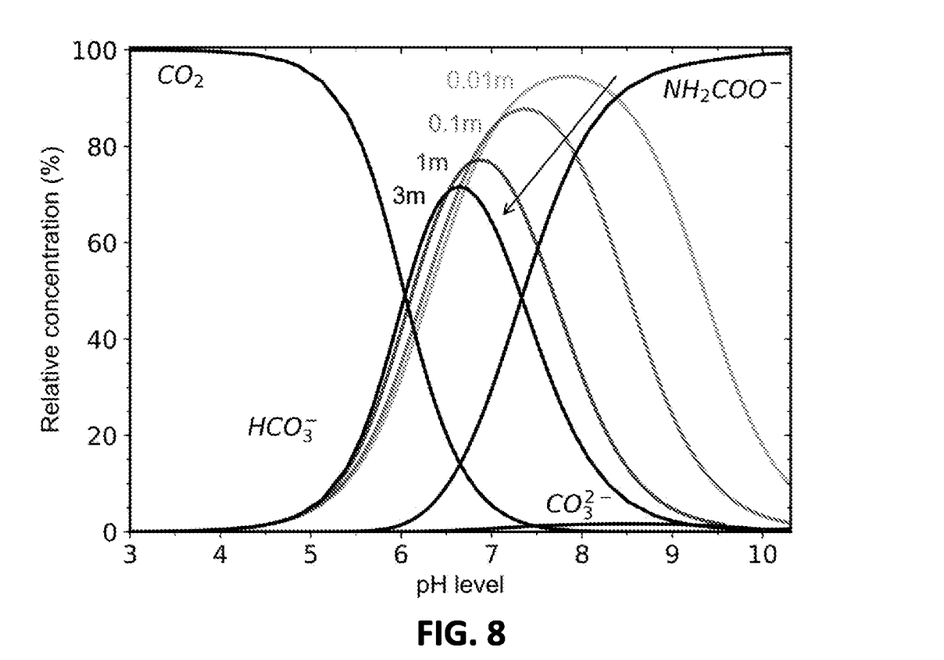
FIG. 8 shows a graph indicating the equilibrium distribution of different carbonated species in ammoniated brine at different pH levels, with varying ammonia concentration.

FIG. 8 shows a graph indicating the equilibrium distribution of different carbonated species in ammoniated brine at different pH levels, with varying ammonia concentration.

There are four different carbon species present in ammoniated brine. Out of these, bicarbonate ions ($HCO_3^-$) and carbamate ions ($NH_2COO^-$) are of particular interest due to their role in the precipitation of sodium in the production of soda ash. Bicarbonate ions are important and desirable for precipitating sodium, while carbamate ions hinder the precipitation of sodium. Carbamate ions dominate at high pH levels, while bicarbonate ions are present at medium pH levels. The data suggests that increasing the total amount of carbon (dissolved $CO_2$) in the brine solution influences the relative concentrations of these species. Specifically, it decreases the relative concentration of bicarbonate ions and shifts the pH peak corresponding to bicarbonate ions towards a less basic (more acidic) value. This effect of increased carbon dioxide is seen in the shift of the curves to the left as the concentration of dissolved $CO_2$ increases.

Returning back to FIG. 1, a mixture of saline solution, dissolved ammonia, ammonium chloride, dissolved carbon dioxide, and precipitated sodium hydrogen carbonate leaves the high-pressure absorption column in the high-pressure absorption column outlet stream 122. The stream 122 passes to a filter 130 to filter out the precipitated sodium hydrogen carbonate. The filter 130 is a filter press.

Precipitated sodium hydrogen carbonate 132 leaves the filter press 130 and enters the calciner 140. The calciner 140 heats the sodium hydrogen carbonate in the absence of oxygen to form soda ash:

$$2NaHCO_3 \rightarrow Na_2CO_3 + H_2O + CO_2 \qquad \text{R9:}$$

The filter press 130 is capable of removing solid precipitate from the solution, with sodium hydrogen carbonate purity of 98.2%.

The reaction that takes place within the high-pressure absorption column may remove the sodium dissolved, lowering the concentration to 0.5M. The reaction that takes place within the high-pressure absorption column may remove the sodium dissolved, lowering the concentration to 0.3M. The reaction that takes place within the high-pressure absorption column may remove the sodium dissolved, lowering the concentration to 0.25M.

Remaining filtrate 134 leaving the filter press 130 contains remaining saline solution, some residual carbon dioxide and some residual ammonia, along with dissolved ammonium chloride. This filtrate stream 134 feeds into a recovery column 150. The recovery column 150 is a distillation column.

Turning to the lime kiln 160: the lime kiln 160 takes in calcium carbonate 162 and heats the calcium carbonate 162 to produce carbon dioxide 164 and calcium oxide 166:

$$CaCO_3 \rightarrow CaO + CO_2 \qquad \text{R10:}$$

The carbon dioxide 164 passes into a compressor 190 to become the pressurized carbon dioxide stream 192. This pressurized carbon dioxide stream 192 is the primary source of carbon dioxide feed for the high-pressure absorption column 120.

The calcium oxide 166 from the kiln 160 feeds into the recovery column 150.

The calcium oxide 166 and filtrate 134 mix and perform a displacement reaction:

$$CaO+2NH_4Cl \rightarrow CaCl_2)+2NH_3+H_2O \quad \quad R11:$$

The recovery column 150 has heat applied, causing the carbon dioxide and ammonia to vaporize and leave the solution out through the top of the recovery column 150 through the recovery stream 152. As mentioned, the recovery stream 152 comprises recycled ammonia and carbon dioxide. The liquid leaving the recovery column 150 in the liquid stream 154 is primarily water with calcium chloride, sodium chloride, and any residual and/or trace amounts of other components (such as ammonia, carbon dioxide, or sodium hydrogen carbonate, for example).

In embodiments of the present disclosure, the ammonium chloride solution, rather than being recycled, is instead utilized as a distinct product. The aqueous ammonium chloride solution is sent to the recovery column, without an input stream of calcium oxide. The distillation column evaporates the dissolved ammonia and carbon dioxide. Following the evaporation of ammonia and carbon dioxide, the remaining solution is treated with sodium chloride. The mixture is cooled down to below 5° C. and salt out ammonia. This precipitated ammonium chloride is then collected and processed for use as a fertilizer. The remaining brine is recycled back to the low-pressure column, containing ammonia and sodium chloride.

The recovered ammonia and carbon dioxide 152 is fed into the low-pressure column 110. The recovered ammonia and carbon dioxide may be bubbled into the low-pressure column.

Undissolved carbon dioxide and ammonia present in the low-pressure column 110 is fed through a low-pressure column gas outlet stream 106 to a compressor 180. The compressor 180 increases the pressure of the carbon dioxide and ammonia 106 to a pressure equal to or greater than the pressure within the high-pressure absorption column 120. The compressor 180 outlet stream 182 feeds directly into the high-pressure column 120.

In embodiments of the present disclosure, the low-pressure column is not present. In embodiments, the feed is fed directly into the high-pressure absorption column. In embodiments, a brine retentate from desalination reverse osmosis (at high pressure) is fed directly into the high-pressure absorption column. In this way, the high pressure that is required as part of the reverse osmosis process is utilized directly in the high-pressure column to facilitate large amounts of carbon dioxide absorption.

In embodiments of the present disclosure, there is a pressure recovery/pressure exchange between a stream downstream of the high-pressure column and the saline feed feeding into the reverse osmosis process, making the process more energy efficient.

Figure 3:
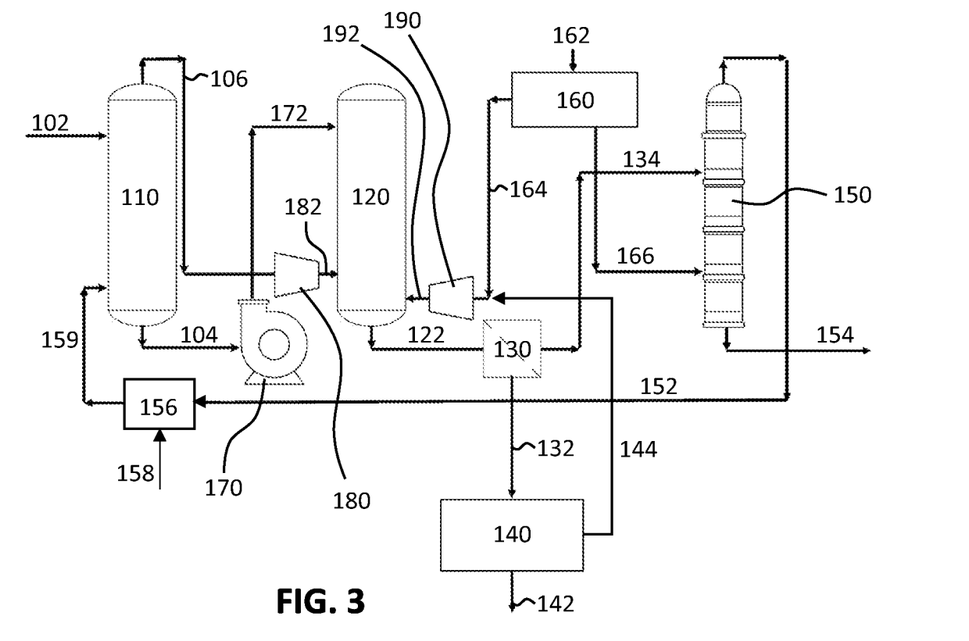
FIG. 3 shows a process flow diagram illustrating a method for producing soda ash using a soda ash production system according to an embodiment of the present disclosure.

FIG. 3 shows a process flow diagram illustrating a method for producing soda ash using a soda ash production system according to an embodiment of the present disclosure.

For the purposes of conciseness, only differences between FIGS. 3-7 with respect to FIG. 1 will be described.

Recovered carbon dioxide 144 from the process within the calciner 140 is recycled back towards the carbon dioxide stream 164 and is fed into the compressor 190.

Additionally, there is a recovery gas make-up 156 where make-up stream 158 is added to the recovery stream 152. Ammonia is part of the make-up stream 158. In embodiments, carbon dioxide is also included in the make-up stream 158. The make-up stream 158 is mixed with the recovery stream 152 and is fed 159 into the low-pressure column 110.

In embodiments where ammonia is added through all or part of the make-up stream, ammonia may not be added in the feed stream 102.

Figure 4:
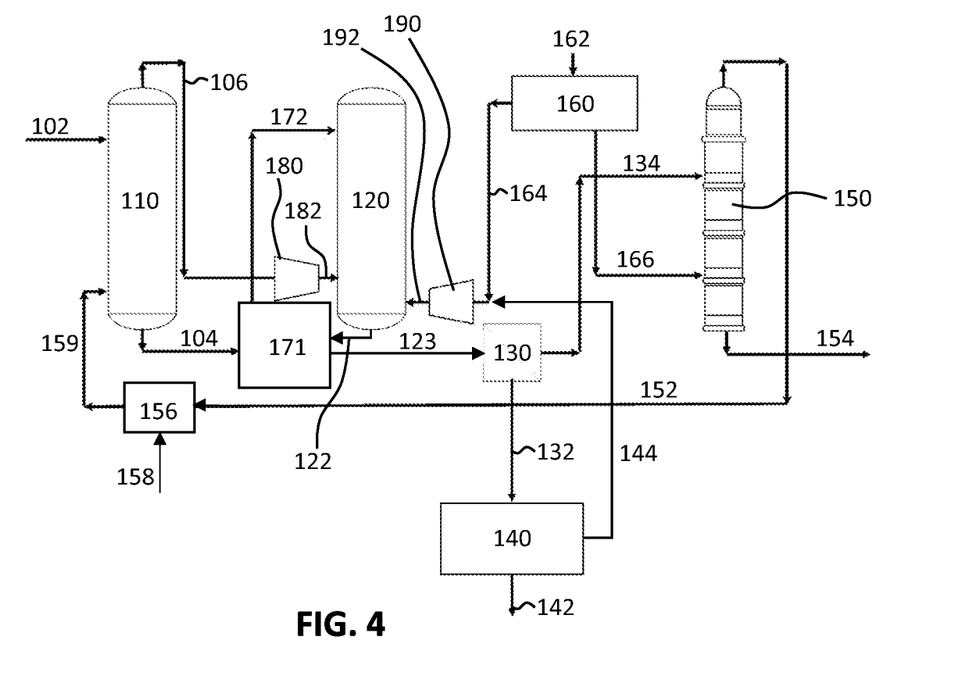
FIG. 4 shows a process flow diagram illustrating a method for producing soda ash using a soda ash production system according to an embodiment of the present disclosure.

FIG. 4 shows a process flow diagram illustrating a method for producing soda ash using a soda ash production system according to an embodiment of the present disclosure.

The embodiment of FIG. 4 is similar to that of FIG. 3, except that instead of a pump 170, there is a pressure recovery system 171. The pressure recovery system 171 transfers high pressure from the high-pressure absorption column outlet stream 122 to the low-pressure column outlet stream 104. This system enhances the energy efficiency of the system by using existing energy within the system to pressurize the saline stream that feeds into the high-pressure absorption column 120. The high-pressure absorption column outlet stream 122 passes through the pressure recovery system 171 and leaves as a lower pressure high-pressure absorption column outlet stream 123, into the filter 130. The low-pressure column outlet stream 104 enters the pressure recovery system 171 and leaves as a higher pressure low-pressure column outlet stream 172.

Figure 5:
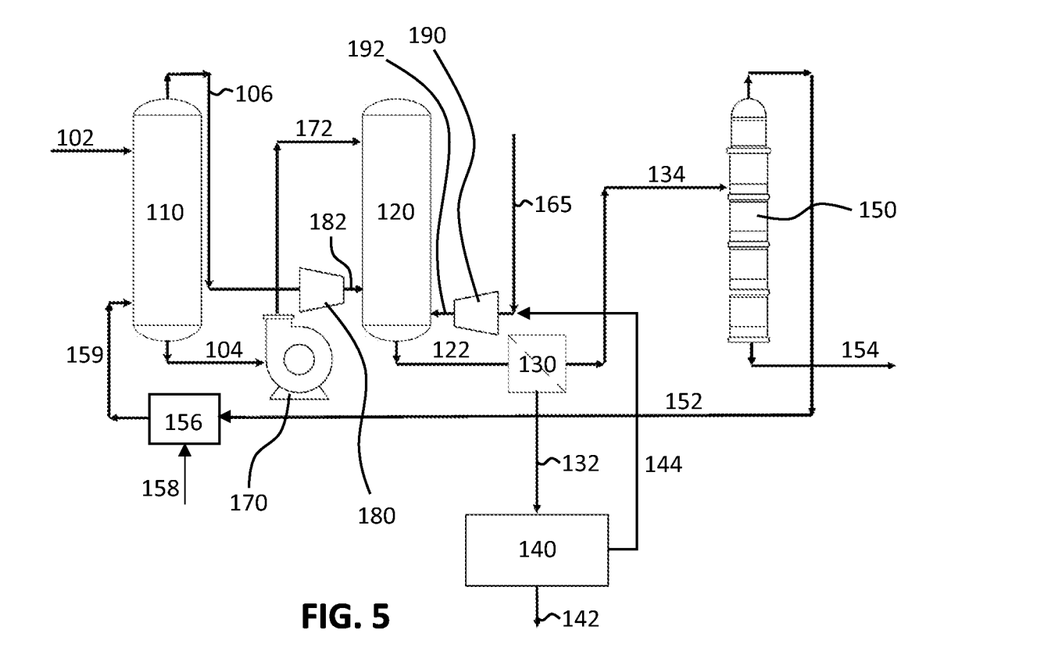
FIG. 5 shows a process flow diagram illustrating a method for producing soda ash using a soda ash production system according to an embodiment of the present disclosure.

FIG. 5 shows a process flow diagram illustrating a method for producing soda ash using a soda ash production system according to an embodiment of the present disclosure.

The embodiment of FIG. 5 is similar to that of FIG. 3, except that there is no lime kiln 160. As such, the carbon dioxide stream 165 may come from any other suitable carbon dioxide source. There is also therefore no calcium oxide stream entering the recovery column 150. Therefore, there is no displacement reaction with calcium in this embodiment. One of the main solutes of the recovery column outlet stream 154 is ammonium chloride. The ammonium chloride in the recovery column outlet stream 154 can be used in other processes, such as for the production of fertilizer. As in embodiments, remaining dissolved carbon dioxide and ammonia is recovered from the process within the recovery column 150 and is output in the gas phase through the recovery stream 152. The recovery column 150 is a distillation column.

Figure 6:
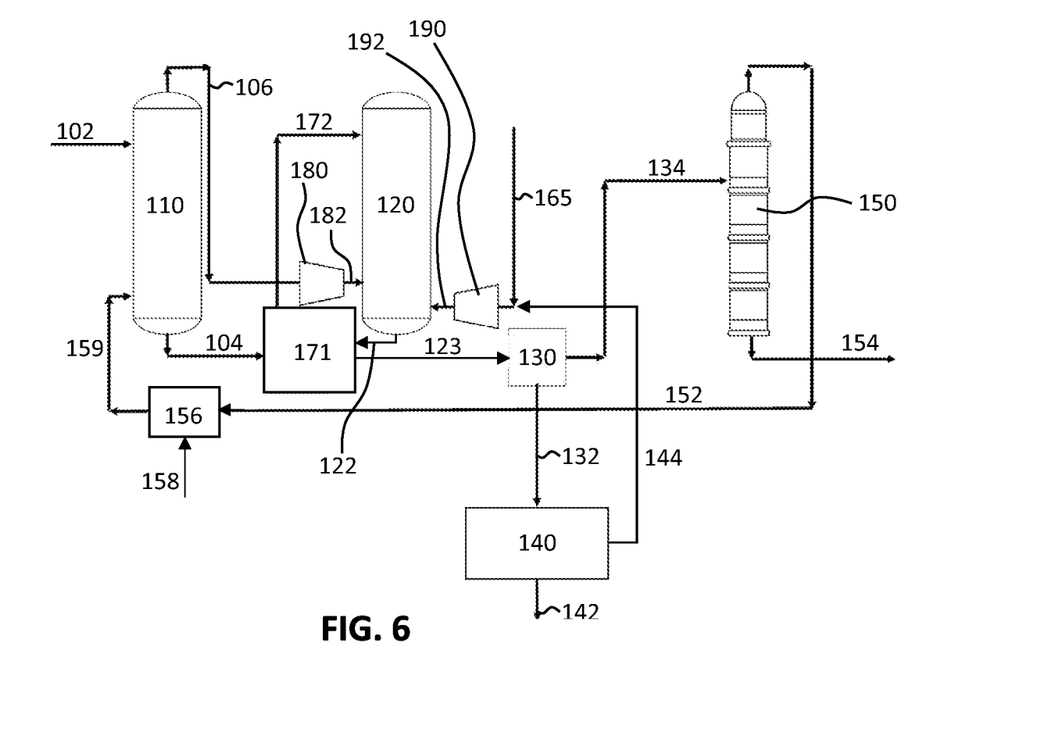
FIG. 6 shows a process flow diagram illustrating a method for producing soda ash using a soda ash production system according to an embodiment of the present disclosure.

FIG. 6 shows a process flow diagram illustrating a method for producing soda ash using a soda ash production system according to an embodiment of the present disclosure.

The embodiment of FIG. 6 is a combination of the embodiments of FIG. 4 (the system and method using a pressure recovery system 171) and FIG. 5. (where there is no lime kiln 160).

Figure 7:
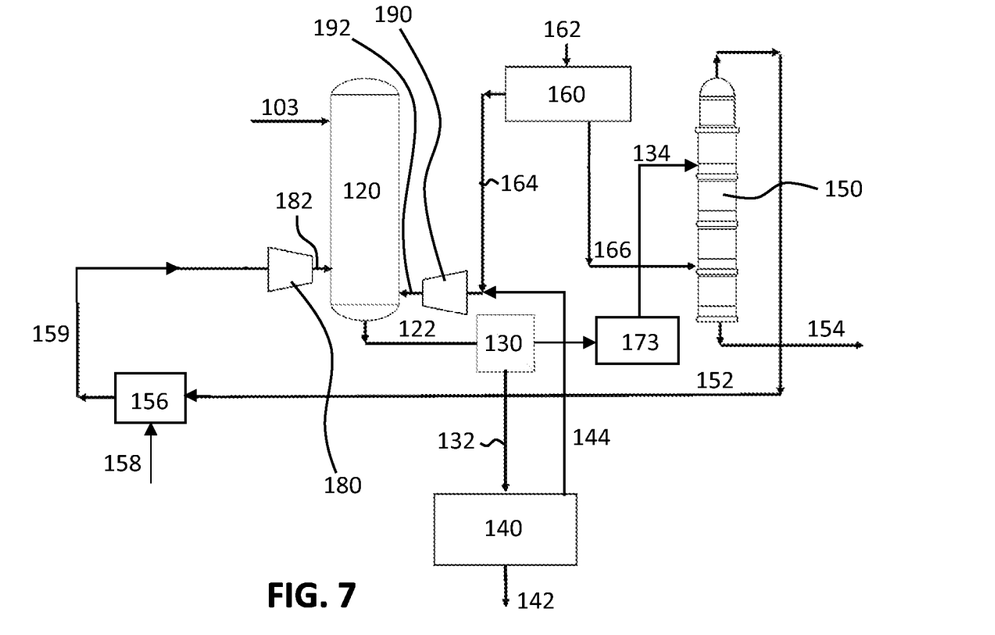
FIG. 7 shows a process flow diagram illustrating a method for producing soda ash using a soda ash production system according to an embodiment of the present disclosure.

FIG. 7 shows a process flow diagram illustrating a method for producing soda ash using a soda ash production system according to an embodiment of the present disclosure.

The embodiment of FIG. 7 is similar to that of FIG. 3, except that the low-pressure column 110, and the pump 170 have been removed. In such embodiments, the saline feed 103 may come from a source of high-pressure saline solution. For example, the saline feed 103 may originate from the waste stream of a reverse osmosis desalination system. Embodiments take advantage of the high-pressure saline stream from reverse osmosis desalination systems to make use of the high-pressure that is already a feature of those streams.

The recovery stream 152 augmented by the make-up stream 158 is fed to the compressor 180 and fed directly into the high-pressure absorption column 120.

High pressure filtrate leaving the filter 130 (without sodium hydrogen carbonate as that has been filtered out and sent to the calciner 140) then passes to a pressure recovery system 173. The filtrate leaving the pressure recovery system 134 passes into the recovery column 150.

In embodiments, the pressure recovery system is used to directly increase the pressure of the feed 103 entering the high-pressure absorption column 120.

In embodiments, the pressure recovery system is used to increase the pressure of a saline feed entering a reverse osmosis desalination system, to reduce the amount of energy required to increase the pressure of the reverse osmosis desalination system to operating pressure.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. The disclosures and the description herein are intended to be illustrative and are not in any sense limiting the present disclosure, defined in scope by the following claims.

Many changes, modifications, variations and other uses and applications of the present disclosure will become apparent to those skilled in the art after considering this specification and the accompanying drawings, which disclose the preferred embodiments thereof. All such changes, modifications, variations and other uses and applications, which do not depart from the spirit and scope of the present disclosure, are deemed to be covered by the invention, which is to be limited only by the claims which follow.

The invention claimed is:

1. A method for producing soda ash (sodium carbonate), the method comprising:
   feeding a saline feed into a low-pressure column;
   feeding ammonia into the low-pressure column;
   forming an ammonia-saline solution within the low-pressure column;
   discharging a low-pressure column outlet stream to a pump, wherein a pump outlet stream is a pressurized saline solution comprising ammonia;
   feeding the pressurized saline solution into a high-pressure column, the high-pressure column being downstream of the low-pressure column;
   feeding pressurized carbon dioxide into the high-pressure column;
   dissolving the carbon-dioxide into the saline solution within the high-pressure column;
   discharging a high-pressure column outlet stream to a filter;
   filtering sodium hydrogen carbonate from the high-pressure column outlet stream; and
   feeding the sodium hydrogen carbonate to a calciner to convert the sodium hydrogen carbonate to soda ash;
   wherein the pressure of the high-pressure column is between 54 to 80 bar; and
   wherein the pressure of the low-pressure column is less than the pressure of the high-pressure column.

2. A method as claimed in claim 1, wherein the pressurized saline solution has a sodium chloride concentration of less than 3 M (moles per liter).

3. A method as claimed in claim 1, wherein the pressure of the pump outlet stream is greater than or equal to the pressure of the high-pressure column.

4. A method as claimed in claim 1, wherein the method comprises the steps of:
   heating calcium carbonate to form carbon dioxide; and
   pressurizing the carbon dioxide to form the compressed carbon dioxide.

5. A method as claimed in claim 4, wherein the pressure of the compressed carbon dioxide is greater than or equal to the pressure of the high-pressure column.

6. A method as claimed in claim 1, wherein a filtrate from the filter feeds into a distillation column, and wherein the distillation column recycles carbon dioxide and ammonia to the low-pressure column.

7. A method as claimed in claim 6, wherein undissolved recycled ammonia and carbon dioxide from the low-pressure column is fed into the high-pressure column.

8. A method as claimed in claim 1, wherein the method comprises the steps of:
   heating calcium carbonate to form carbon dioxide; and
   pressurizing the carbon dioxide to form the compressed carbon dioxide.

9. A method as claimed in claim 8, wherein a filtrate from the filter feeds into a distillation column, and wherein the distillation column recycles carbon dioxide and ammonia to the low-pressure column.

10. A method as claimed in claim 9, wherein undissolved recycled ammonia and carbon dioxide from the low-pressure column is fed into the high-pressure column.

11. A method as claimed in claim 9, wherein the step of heating forms carbon dioxide and calcium oxide, and wherein the method comprises feeding the calcium oxide into the distillation column.

12. A method as claimed in claim 11, wherein an outlet stream of the distillation column comprises calcium chloride solution.

13. A soda ash production system, the soda ash production system comprising:
   a high-pressure absorption column configured to have a pressure of between 54 to 80 bar;
   a low-pressure column upstream of, and fluidly connected to, the high-pressure column, the low-pressure column configured to combine ammonia and a saline feed to form an ammonia-saline solution;
   a pump configured to pressurize the ammonia-saline solution prior to being fed into the high-pressure column;
   a filter fluidly connected to an outlet of the high-pressure column; and
   a calciner connected to the filter;
   wherein the high-pressure column is configured to receive the pressurized ammonia-saline solution and pressurized carbon dioxide,
   wherein the filter is configured to filter sodium hydrogen carbonate from the outlet of the high-pressure column; and
   wherein the calciner is configured to convert the sodium hydrogen carbonate to soda ash.

14. A soda ash production system as claimed in claim 13, wherein the soda ash production system comprises a heating system for heating calcium carbonate, the heating system fluidly connected to a compressor such that carbon dioxide formed by heating the calcium carbonate can be fed to the compressor and an outlet stream of the compressor is the pressurized carbon dioxide.

15. A soda ash production system as claimed in claim 14, wherein the soda ash production system comprises a distillation column, the distillation column being configured to receive calcium oxide from the heating system, and filtrate from the filter, the distillation column also being configured to recycle carbon dioxide and ammonia to the low-pressure column.

\* \* \* \* \*